Figure 1:
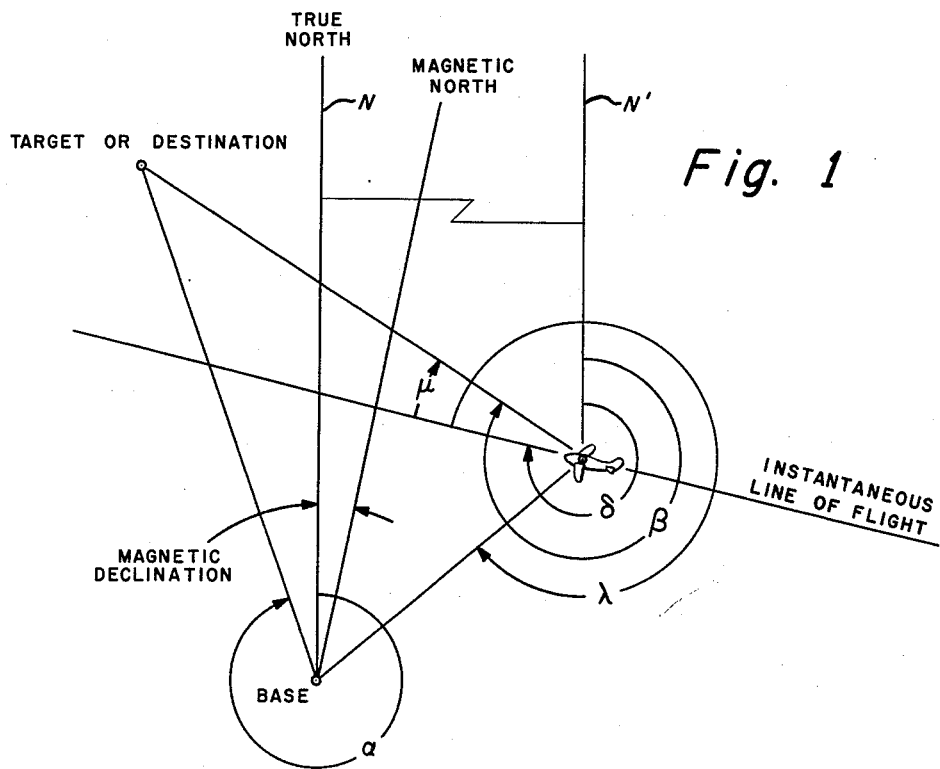

Dec. 19, 1961     L. S. GUARINO     3,013,723
BEARING AND DISTANCE INDICATING SYSTEM
Filed July 3, 1956     4 Sheets-Sheet 1

INVENTOR.
LOUIS S. GUARINO
BY
ATTORNEYS

Dec. 19, 1961

L. S. GUARINO 3,013,723

BEARING AND DISTANCE INDICATING SYSTEM

Filed July 3, 1956

4 Sheets-Sheet 2

INVENTOR.
LOUIS S. GUARINO

BY

ATTORNEYS

Dec. 19, 1961  L. S. GUARINO  3,013,723
BEARING AND DISTANCE INDICATING SYSTEM
Filed July 3, 1956  4 Sheets-Sheet 4

INVENTOR.
LOUIS S. GUARINO
BY
ATTORNEYS

United States Patent Office 3,013,723
Patented Dec. 19, 1961

3,013,723
BEARING AND DISTANCE INDICATING SYSTEM
Louis S. Guarino, Hatboro, Pa., assignor to the United States of America as represented by the Secretary of the Navy
Filed July 3, 1956, Ser. No. 595,804
14 Claims. (Cl. 235—187)
(Granted under Title 35, U.S. Code (1952), sec. 266)

The invention described herein may be manufactured and used by or for the Government of the United States of America for governmental purposes without the payment of any royalties thereon or therefor.

The present invention relates to a bearing and distance indicating system, and more particularly to a bearing and distance indicating system of the fully automatic, dead reckoning type for use in aircraft.

Existing automatic dead reckoning navigational systems have generally resolved the geographical position of an aircraft in flight relative to its base or destination in terms of Cartesian coordinates, which may be in degrees of latitude and longitude, or in miles N—S and E—W from a particular reference point determined by a set of intersecting primary grid lines. These coordinates are readily obtainable from the air-ground position indicator of currently available semi-automatic dead reckoning navigational equipment. In order to assist piloting of an aircraft to a predetermined geographical position, these rectangular coordinates are manually converted into a polar coordinate type of indication in the aircraft with the aid of a chart and plotting board so that a compass bearing and distance may be obtained. Thus, the determination of a bearing and distance relative to a predetermined geographical position were manually computed, and the triangulation technique involved provided a satisfactory solution, so long as the aircraft was relatively slow-moving.

With the advent of jet fighter aircraft, an urgent need evolved for a completely automatic dead reckoning navigation system capable of instantaneously indicating in polar coordinate notation the position of an aircraft relative to either its target or base. The jet pilot is not primarily interested in his exact latitude or longitude, but rather, is most concerned during the relatively short duration of his flight with maintaining a suitable course to intercept the target or base. The high speed flight of which the contemporary jet aircraft is capable does not readily lend itself to the convenient or accurate determination of the dead reckoning in terms of bearing and distance by manual computation techniques. The modern jet aircraft cockpit, in addition, has grown smaller, thus requiring smaller plotting boards with associated possibilities for introducing greater error. Thus, it can be seen that the performance of a tactical mission depends to a large extent upon the accuracy and speed with which the dead reckoning navigation is able to be performed, and further, because of the higher speed involved, it is almost axiomatic that determining a pilot's position should be instantaneous with an equal degree of accuracy to the navigation performed in part by manual procedures in slower speed aircraft, where time permits manual calculation and plotting of the dead reckoning in terms of polar coordinate notation. It becomes apparent, therefore, that the limitations and deficiencies of existing systems, as noted above, are of real concern, particularly to the pilot of a high-speed jet aircraft, and a solution dictates the design of a completely automatic dead reckoning navigation equipment which would permit the jet pilot to devote his full attention to the tactical assignment pertaining to his mission.

The enumerated deficiencies and limitations are overcome by the bearing and distance indicating system of the instant invention. The dead reckoning apparatus herein described provides the pilot with a continuous visual indication of the aircraft's position in terms of a bearing and a distance relative to either a base or target, the choice being selectively made at the discretion of the pilot by means of a relay-controlling switch. The equipment which provides the continuous indication of bearing and distance is of the dead reckoning type in which synchro resolvers and potentiometers as basic components are employed in a summing operation to determine the ground track and the components of the ground speed of the aircraft, taking into consideration all factors which affect the flight of the aircraft, such as true and magnetic heading, wind velocity, air-speed, of the aircraft, etc. A ground speed and ground track synchro resolver provides a voltage proportional to the ground speed when the ground track voltage is nulled through a servo-mechanism, the angular position assumed by the rotor of the ground speed and ground track synchro resolver then indicates the ground track angle of the aircraft. The ground speed is integrated as a function of time by means of an electro-mechanical integrator to produce a shaft rotation indicating ground distance which is resolved mechanically by a component resolver into N—S, E—W components. The mechanical output of the component resolver is utilized to drive the variable arms of centertapped potentiometers to compute cumulative N—S, E—W distance from the reference or base as the aircraft proceeds in flight. The potentiometers are connected across a voltage source and the voltages at the variable contacts are impressed on a ground distance resolver-converter which produces a voltage indicating the resultant ground distance to the base, simultaneously converting from rectangular to polar coordinate notation when the rotor of the ground distance resolver-converter is rotated to a null output indication by a relative bearing servo-mechanism. The voltage representing the ground distance to the base controls a servo-mechanism that sets range in nautical miles on a counter which is contained within a panel mounted indicator. The position assumed by the rotor of the ground distance resolver-converter for a null output indication represents the aircraft's relative bearing to the base, and is presented by means of a pointer and dial, located in the same panel mounted indicator mentioned above. When it is desired to obtain distance and bearing to a target rather than to a base, a relay is operated to introduce base to target distance and bearing into the system. Target distance and bearing are preset manually, prior to flight, on a target range counter and target bearing dial, respectively, which control the voltage and position of the rotor of a target range and bearing synchro resolver. By operation of the relay referred to above, these voltages proportional to the magnitude of the N—S, E—W components of target distance, are algebraically added to the circuits of the ground distance resolver-converter to indicate the relative bearing and distance of the aircraft to the target. The dead reckoning navigational system provides continuous and instantaneous bearing and distance indication up to a 500 mile range, although the operational range may be varied in accordance with design requirements.

The embodiment of a bearing and distance indicating apparatus of the instant invention, summarily described above, completely eliminates the manual plotting of the dead reckoning, and further, with the deletion of the plotting board, the attending possibilities for introducing error are removed. The pilot is relieved of the problem of manually determining a suitable course to steer in order to intercept a target or to return to the base, and he may now devote his full attention to operation of the aircraft according to the tactical assignment pertaining to his mission, with the confidence of achieving a greater degree of success. In addition, an installation of the apparatus in an aircraft affords a substantial volume and weight reduction over existing dead reckoning navigational equipment, the total weight of the bearing and distance indicating apparatus of the instant invention being less than thirty pounds. It is deemed that this attribute in itself is significant in view of the trend in contemporary aircraft toward inadvertently becoming heavier and more congested by seeming endless additions of complex electronic equipment. Therefore, not only are the deficiencies and limitations as previously enumerated overcome, but also the bearing and distance indicating apparatus of the instant invention, by virtue of its greatly diminished volume and weight as compared to existing systems, provides for ease of installation, being accommodated into the cockpit of a modern jet fighter aircraft in a simple and compact manner.

An object of the present invention is the provision of a bearing and distance indicating system which enables the pilot of an aircraft in flight to be cognizant of his relative geographical position at all times.

Another object is to provide a bearing and distance indicating system in which the dead reckoning is performed automatically without resort to any manual calculations or a plotting board, thus enabling the pilot of a jet fighter aircraft to devote his full attention to the tactical assignment of his mission.

A further object of the invention is the provision of a selective bearing and distance indicating system which provides the pilot of an aircraft in flight with instantaneous and continuous bearing and distance information relative to either a base or a destination.

Still another object is to provide a bearing and distance indicating system in which the geographical polar coordinate position of an aircraft in flight may be visually ascertained from an indicator showing ground track, distance information, and relative bearing selectively to either a base or a destination.

A final object of the present invention is the provision of a bearing and distance indicating system that can be incorporated simply and easily into the cockpit of a modern jet fighter aircraft, thereby providing a compact installation compatible with the installation of existing equipment in the aircraft.

The exact nature of this invention as well as other objects and advantages thereof will be readily apparent from consideration of the following specification relating to the annexed drawings in which:

FIG. 1 is a diagram showing in a greatly exaggerated plan view the various angular quantities that relate to an aircraft in flight, relative to its base and its destination.

Figure 2:
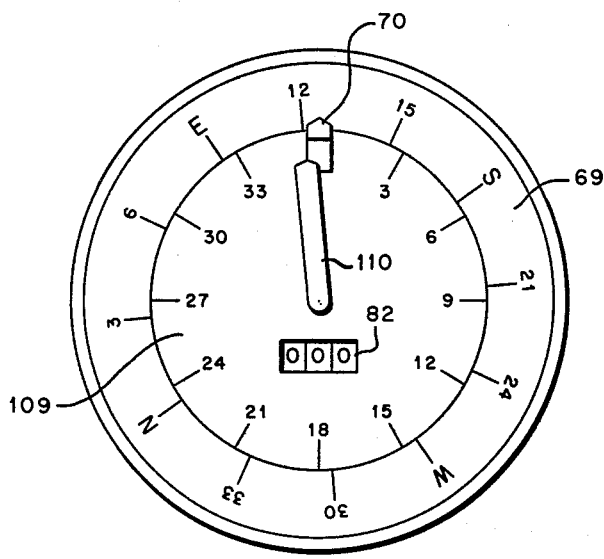
Figure 3A:
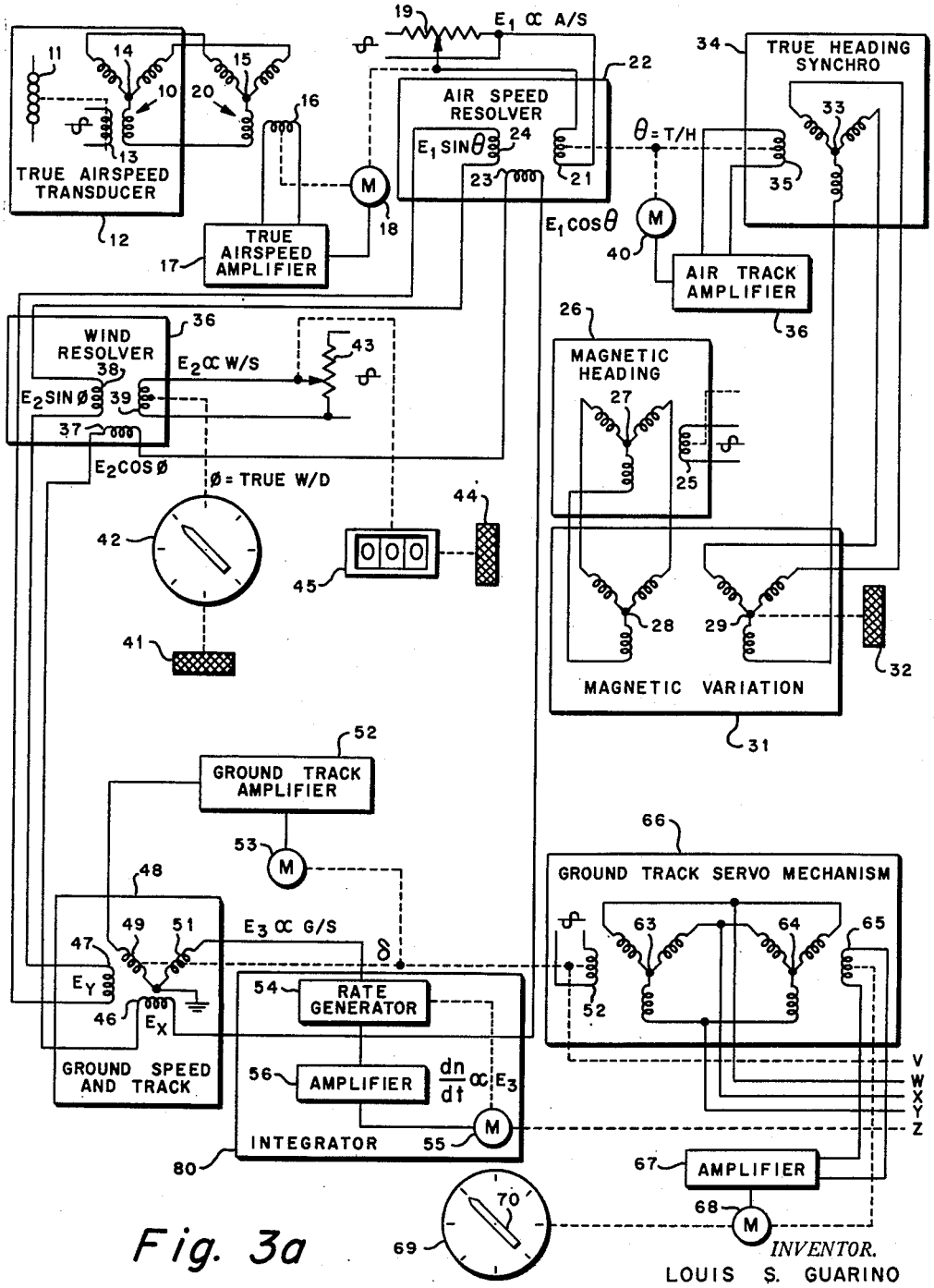
Figure 3B:
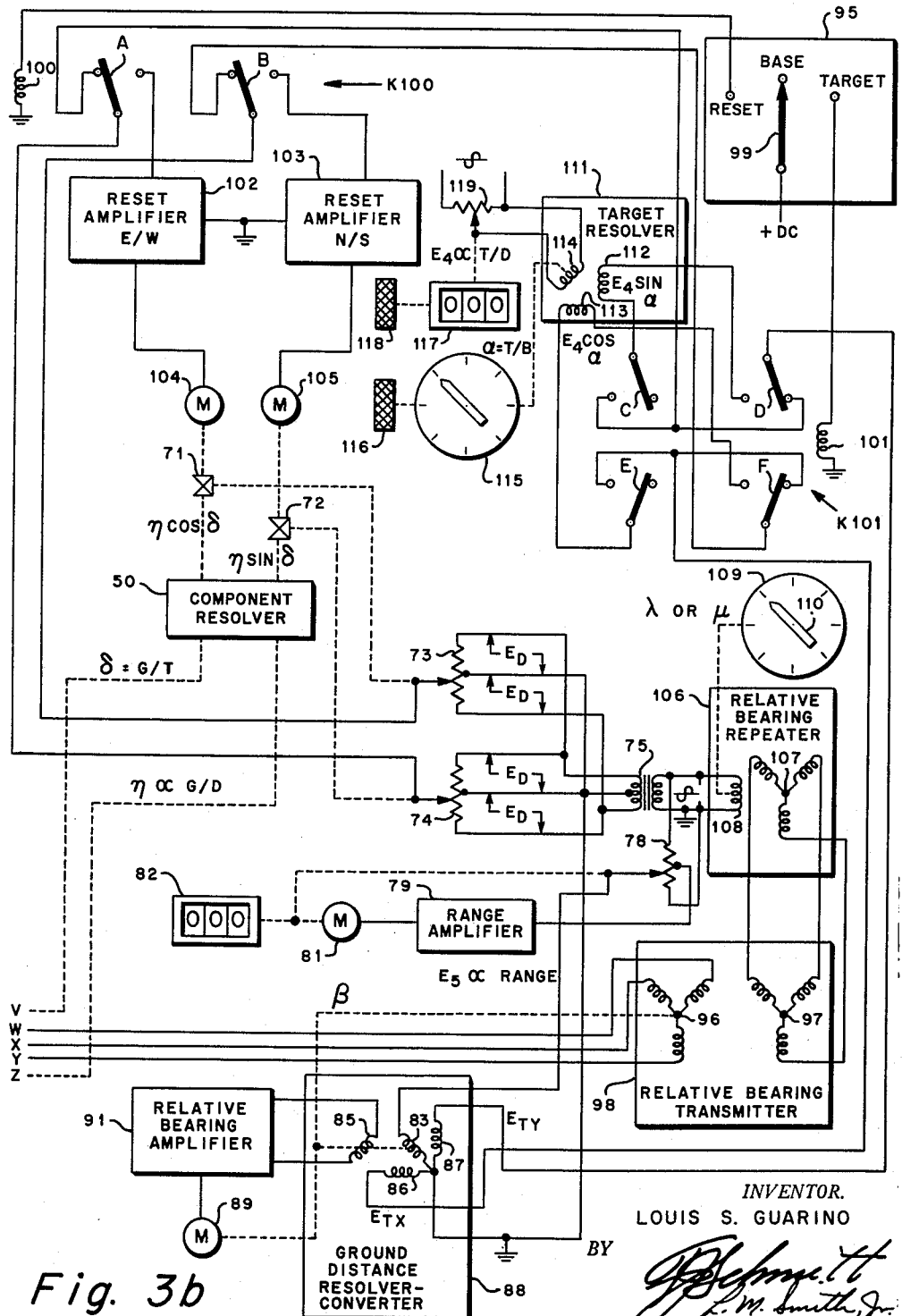
Figure 4:
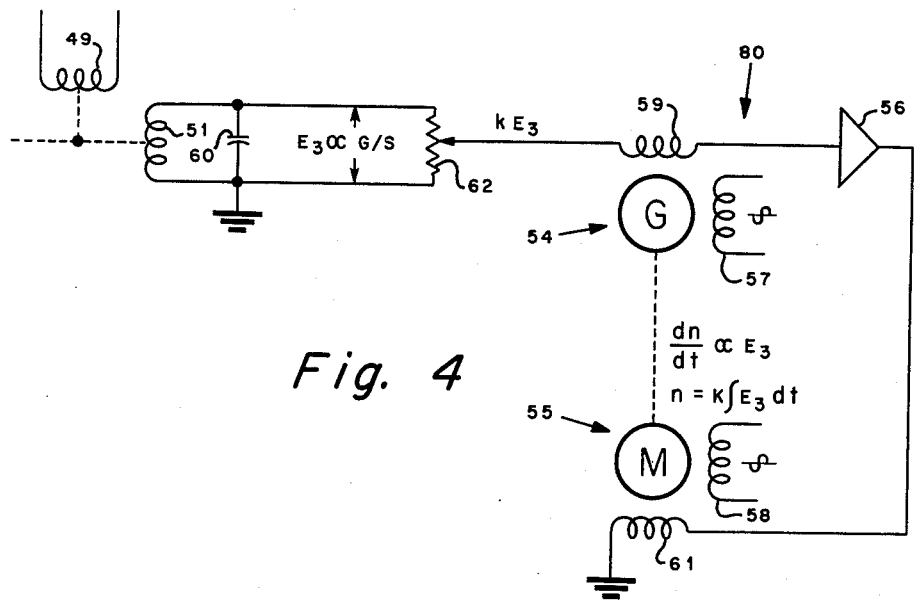
Figure 5:
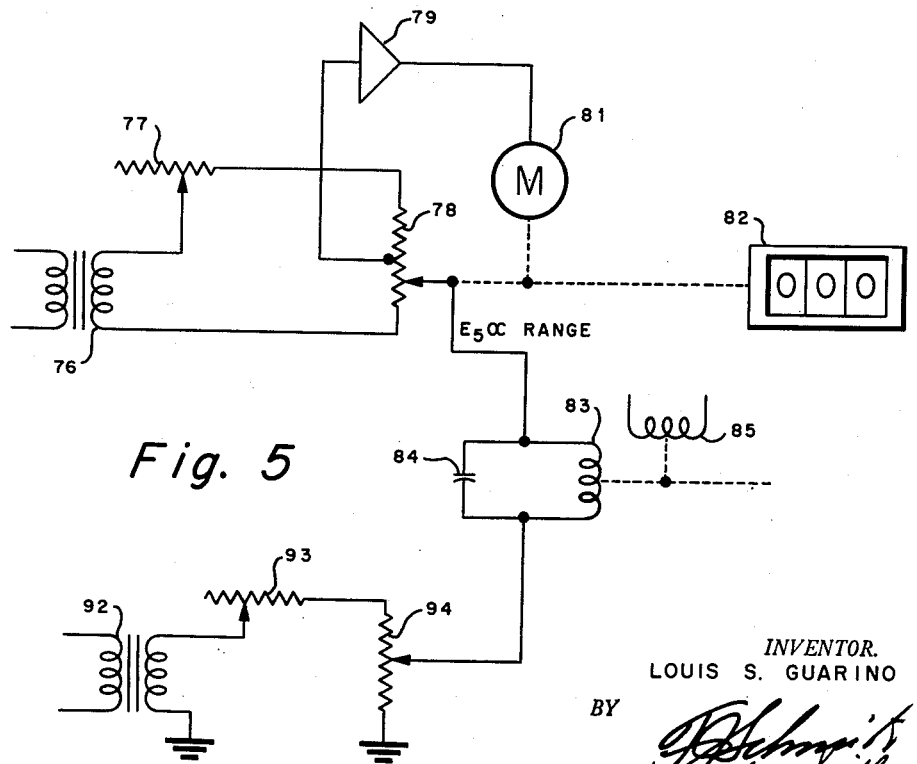

FIG. 2 illustrates a front elevation view of a preferred embodiment of the indicator, showing the manner in which distance and various bearings shown in FIG. 1 are presented to the pilot, FIG. 3a and FIG. 3b are schematic representations of the various components of the bearing and distance indicating system of the instant invention, and are to be taken together to form a complete composite schematic diagram, FIG. 4 is a schematic diagram of the circuit of the electro-mechanical integrator incorporated in the instant invention, FIG. 5 is a schematic representation of the range indicating circuit incorporated into the instant invention, showing in greater detail the voltage-bucking null seeking type of operation that is associated with the range servo-mechanism.

Referring now to the drawings, in which like numerals refer to like or corresponding parts throughout the several views, in FIG. 1 is shown a general presentation of the various angular relationships that are concerned with an aircraft in flight, relative to its base, destination, and true heading. The azimuth N indicating the direction of true north is made a convenient reference line from which all true bearings are determined. The length of the sides of the generally scalene triangle formed, as shown, may represent distances up to a maximum of 500 nautical miles, although the choice of range is arbitrary and may be whatever operational considerations dictate. An azimuth line N' parallel to the true north line permits the clockwise measurement of the true heading of the aircraft as well as the true bearing to both the base and target. In the simplified representation in FIG. 1, the aircraft heading is shown coincident with the instantaneous ground track angle. However, it should be understood that this relation is true only in the absence of wind or when the wind direction coincides with the line of flight. Hence, the aircraft heading which is independent of the ground track angle $\delta$ is referred to by the designator $\theta$, not shown in FIG. 1. An angle of magnetic declination is also indicated in FIG. 1. Since the true heading of an aircraft is derived from the synchro system of the aircraft's magnetic compass, a variation setting differential synchro is provided to correct for the magnetic declination. Relative to the geometry of the presentation as seen in FIG. 1, the various angles measured in a clockwise direction are defined as follows:

$\alpha$=True target bearing from base
$\beta$=True target bearing from the geographical position of the aircraft
$\delta$=Ground track angle
$\mu$=Relative bearing to target from the line of flight of the aircraft
$\lambda$=Relative bearing to base from the line of flight of the aircraft In FIG. 3a and FIG. 3b is illustrated a schematic representation of the bearing and distance indicating system of the instant invention. The embodiment as herein described and illustrated was designed to operate from 115 volt, 3 phase A.C. power of standard aircraft frequency of 400 cycles per second, and 27.5 volt D.C. power. However, power sources having different voltage and frequency characteristics may be employed without departing from the spirit or scope of the invention. In FIG. 3a, a transducer 11 in a true airspeed transducer circuit 12 is connected into the pitot-static system of the aircraft, and produces an angular displacement which is directly proportional to true airspeed. The displacement is transmitted to rotor winding 13 of a synchro transmitter generally designated by the reference numeral 10. the dotted line as indicated representing a direct mechanical coupling. The coil of rotor 13 is energized from an A.C. source as denoted by the notation of a representative sine wave, and is shown in close proximity with stator windings 14 of the synchro transmitter 10 for magnetic coupling. Stator windings 14 are shown in conventional representation, spaced 120 degrees apart, and are connected in parallel to a similar set of windings 15 of a control transformer generally designated by the reference numeral 20, having a rotor winding 16 which constitutes the input to a true airspeed amplifier 17. A servo loop circuit comprising amplifier 17 and motor 18 positions rotor 16 for a minimum signal level to the input of amplifier 17. Motor 18 is of a split phase type having a reference and an excitation winding in quadrature phase relation, rotation of the shaft of motor 18 being obtained by application of the output voltage of amplifier 17 to the excitation phase winding of motor 18. The shaft of motor 18 directly drives rotor 16 and the wiper of potentiometer 19. It becomes apparent, therefore, that the position assumed by the wiper of potentiometer 19 will be indicative of the magnitude of the true airspeed of the airplane.

A voltage determined by the position of the wiper of potentiometer 19 is applied to rotor 21 of an airspeed resolver 22, which comprises two stator windings 23 and 24, respectively, that are electrically disposed at right angles to each other. Rotor 21 is ultimately positioned by means actuated by circuits responsive to the aircraft's magnetic heading, rotor 25 of the magnetic heading synchro repeater 26 obtaining its angular displacement from a suitable synchro transmitter in the aircraft's magnetic compass system. Stator winding 27 is directly connected to a comparable set of windings 28 in a variation setting differential synchro 31. The immediately adjacent windings 29 may be rotated relative to windings 28 by an adjustable means 32 which may be a screw driver adjustment or a knob, as shown, or the like. Windings 29 are connected in parallel to stator windings 33 of a true heading synchro control transformer 34. Rotor 35 comprises the input to air track amplifier 36 whose output energizes one phase of the split phase windings of motor 40, the shaft of which drives rotors 21 and 35 concurrently.

A wind resolver 36, which may be identical in construction to the airspeed resolver 22, comprises two stator windings 37 and 38 which are mutually perpendicular, and a rotor winding 39 that is capable of being angularly displaced relative to the stator windings by adjusting means such as a manually positioned adjusting knob 41 which concurrently positions a dial 42 that indicates the wind direction setting made in accordance with the prevailing wind direction. A wiper on potentiometer 43 is manually controlled by a similar knob 44 that concurrently directly drives a wind speed counter 45, which, like the wind direction dial 42, is initially preset to the magnitude of the prevailing wind velocity prior to the undertaking of a flight, and thereafter adjusted periodically, as necessary, to conform to changing wind conditions.

As shown in FIG. 3a, the respective stator windings of both the airspeed and wind resolvers 22 and 36 are observed to be connected in series with mutually perpendicular stator windings 46 and 47, respectively, of a ground speed and track resolver-converter 48. The rotor of the resolver-converter 48, like its stator windings, is comprised of coils 49 and 51 which are spaced 90 electrical degrees apart. One rotor coil 49, termed the sine winding, is connected to a ground track amplifier 52 in a servo loop circuit with motor 53, the shaft of which angularly positions coil 49 so that the angular position of coil 49 maintains a null or minimum signal input to amplifier 52. It will be noted that the shaft rotation of motor 53 imparts identical rotations to the interconnected coils 49 and 51 of resolver-converter 48 and the rotor 52, of ground track servo mechanism 66, to be described below and also constitutes a mechanical input to component resolver 50, shown in FIG. 3b. When rotor winding 49 is at a null position, rotor winding 51, being 90 electrical degrees displaced therefrom and hence termed the cosine winding, is magnetically coupled with adjacent mutually perpendicular stator coils 46 and 47 for a maximum value of induced signal voltage which is applied to rate generator 54 in an electro-mechanical integrator circuit 80 shown in greater detail in FIG. 4. The electro-mechanical integrator 80 is basically comprised of amplifier 56, rate generator 54 and motor 55 integrally combined into a unitary assembly, in the manner of a conventional dynamotor. The integrator circuit is discussed in detail with reference to FIG. 4, in connection with the operation of the instant invention described below. Rotor winding 52 in the ground track servo mechanism 66 is magnetically coupled with stator windings 63 whose respective coil voltages also appear at the stator windings 64, comprising with rotor winding 65 a control transformer. Amplifier 67 receives its input from rotor 65, and motor 68 as in the other servo circuits responds to produce a shaft rotation effective to angularly position rotor 65, correcting the error voltage introduced in rotor winding 65 and simultaneously positioning a dial 69 that is calibrated to indicate the ground track angle. It will be apparent from the foregoing that the ground speed and track resolver-converter 48 in conjunction with the associated elements comprising the servo loop circuit is capable of converting a quantity expressed as component voltages in Cartesian form into the absolute value of the quantity in polar form having an associated angle.

The output of motor 55 is a shaft rotation proportional to ground distance and constitutes a second input to the component resolver 50, which is of a mechanical ball type. Component resolver 50 is capable of resolving a vector having a magnitude and direction, quantities which in the instant invention correspond to the ground distance and ground track inputs to the component resolver, respectively, into shaft displacements proportional to N—S, E—W components of distance traveled. The shaft displacements are transmitted through bevel gear differential assemblies 71 and 72 to the wipers of potentiometers 73 and 74, respectively, for conversion to corresponding N—S and E—W voltage components. Two reset amplifiers 102 and 103, whose outputs provide excitation for motors 104 and 105, respectively, are utilized in the zeroing of potentiometers 73 and 74 prior to the initial presetting of data into the system comprising the instant invention. The shafts of motors 104 and 105 are connected mechanically to the wipers of the potentiometers 73 and 74, respectively, through the respective bevel gear differential assemblies 71 and 72. This zeroing or presetting operation is initiated by moving the selector 99 of a three-position selector switch assembly 95 as shown in FIG. 3b to the reset position to energize the relay coil 100 of the relay assembly K100 to move the contacts A—B of the relay assembly K100 to the right, as shown in FIG. 3b, to connect the respective reset amplifiers 102 and 103 to be energized by the voltages appearing at the wiper arms of potentiometers 73, 74. The wiper arms are thereby driven to a zero signal position.

For operation of the instant invention according to the base mode of operation, the selector 99 of the three position selector assembly 95 is placed in the base position illustrated in FIG. 3b to connect the electrical leads from the wipers of potentiometers 73 and 74 through contacts A—B of relay assembly K100 and through the contacts D—F of relay assembly K101 to both mutually perpendicular coils 86 and 87 of a ground distance resolver-converter 88. It is to be understood that contacts A—B of relay assembly K100 and the contacts D—F and C—E of relay assembly K101, as shown in FIG. 3b, represent normally closed contacts which are moved from the positions shown to their respective alternate positions by energization of the relay coils 100 and 101, respectively. The ground distance resolver-converter 88, which is essentially the same in design and function as the ground speed and track resolver-converter 48, described above, is incorporated into a relative bearing servo loop circuit comprising a relative bearing amplifier 91, a motor 89 connected to the output of amplifier 91, and rotor coil 85, the sine winding, angularly positioned by the shaft of motor 89 to maintain a null or minimum input signal voltage for amplifier 91. The shaft of motor 89 is not only connected to mutually perpendicular rotor coils 83 and 85 but also to windings 96 of a relative bearing differential synchro transmitter 98, said synchro windings 96 being electrically connected in parallel with the stator windings 63 and 64 of the ground track servo mechanism circuit 66. The relative bearing transmitter 98 also includes a second winding 97 in which a voltage is introduced proportional to the ground track angle and modified by the angular displacement of coil 96, which voltage also appears by virtue of suitable electrical connections in the stator winding 107 of a relative bearing repeater 106. Rotor coil 108 is mechanically coupled to a relative bearing indicator dial 109, the pointer 110 of which is positioned in accordance with the angular position of coil 108, which position is responsive to alignment of the magnetic flux of coil 108 with the flux of winding 107. Referring again to the ground distance resolver-converter 68, coil 83, the cosine winding thereof, is connected with potentiometer 78 in a voltage bucking arrangement, so that the coil 83 and the potentiometer 78 jointly provide the input for range amplifier 79 of a range indicating circuit. The output of amplifier 79 actuates motor 81, which as in previous servo loop circuits provides a rotary displacement which is used to drive the range counter 82 and concurrently drives the wiper of potentiometer 78 toward a null position. The range indicating circuit, consisting essentially of potentiometer 78, range amplifier 79, and motor 81 is described in greater detail in connection with FIG. 5 which includes additional detailed features of this circuit.

For operation of the instant invention according to the alternative target mode of operation, selector 99 of the three-position selector switch assembly 95 must be moved to the target position so that signals representative of the components of the distance between the base and a preselected target may be inserted into the system. The additional components required to introduce this additional information include a target resolver 111, which is essentially a replica of the wind resolver 36, described above. The coil 114 of the target resolver 111 may be angularly displaced relative to mutually perpendicular coils 112 and 113 thereof by means of a rotatable shaft, adjustment for which is provided by manually operable means, such as knob 116, which concurrently actuates a dial 115 that is calibrated to indicate target bearing from the base. A similar adjustable means, such as knob 118, drives a target range counter 117 calibrated to read in nautical miles and concurrently drives the wiper on potentiometer 119 so that the appropriate portion of the applied voltage across the potentiometer 119 appears across the winding 114. Since the stator coils 112 and 113 are in quadrature phase relation, the voltages induced in these coils represent N—S, E—W components of target distance from the base. The coils 112 and 113 are connected to contacts C—D and E—F, respectively, of the relay assembly K101 in such a manner that the voltages induced in these coils are inserted into the system for algebraic combination with the other information derived by the system when the coil 101 of the relay assembly K101 is energized by moving the selector 99 to the target position to connect coil 101 with a D.C. source.

FIG. 2 depicts a front elevation view of a preferred embodiment of the panel mounted indicator, and illustrates the manner of presentation of ground track, relative bearing, and distance information to the pilot. The face of the indicator is composed of two concentric dials, calibrated in degrees, an inner fixed dial 109, an outer dial 69 which is peripherally driven by the shaft of motor 68, a small fixed pointer 70, a large movable pointer 110, and a counter 82. The outer dial 69 is used in conjunction with the small pointer 70 to indicate the ground track angle δ. The inner dial 109 is used in conjunction with the large movable pointer 110 to indicate either of the relative bearings, μ or λ. The movable pointer 110 is directly coupled to rotor 108 of relative bearing repeater 106, as shown in FIG. 3b. The counter 82 indicates range in nautical miles to either a base or target, and its range indication is derived from the shaft rotation of motor 81. It should be noted that the relative bearing indication means comprising inner dial 109 and movable pointer 110 are not limited merely to application with the bearing and distance indicating system of the instant invention. The embodiment of the indicator, as illustrated in FIG. 2, and described in connection with FIG. 3a and FIG. 3b, has proved to be a versatile instrument capable of performing multiple functions. For example, the relative bearing repeater 106 associated with dial 109 and movable pointed 110 has been used with the aid of appropriate switching to indicate magnetic and radio compass bearings. In this manner, the indicator aids in correlating the position information that may be available from other navigational devices installed in the aircraft. Notwithstanding its other potential applications, the fundamental purpose of the relative bearing indication means specifically comprising dial 109 and pointer 110 in the bearing and distance indicating system of the instant invention is to indicate either of the relative bearings, μ or λ of a target and base, respectively, depending on the mode of operation being employed.

Since the detailed features shown in FIGS. 4 and 5 can be described most effectively in terms of the operation of these components of the instant invention, these figures will be described below in connection with the following description of the operation of this device.

*Operation*

The operation of the bearing and distance indicating apparatus of the present invention can be described most effectively principally with reference to the showing in FIGS. 3a and 3b augmented by FIGS. 4 and 5. The following notations which appear throughout the drawings and the remainder of the specification will be helpful in discussing the operation of the system:

A/S—Air speed  
G/D—Ground distance  
TAS—True air speed  
T/H—True heading  
$\theta$—True heading angle  
G/S—Ground speed  
G/T—Ground track  
W/D—Wind direction  
W/S—Wind speed  
$\phi$—True wind angle The aircraft's magnetic heading is shown in FIG. 3a to be obtained from a synchro transmitter in the aircraft's magnetic compass system, rotor 25 of synchro repeater 26 receiving an angular displacement proportional to the magnetic heading. A reference A.C. voltage is applied for excitation of rotor 25 as indicated. The heading signal is fed through a synchro differential 31 where it is modified in accordance with the applicable correction for the angle of magnetic declination. The resultant signal is fed to a synchro control transformer 34 in the true heading computing portion of the system. The rotor 35 of this synchro is automatically positioned by a servo mechanism comprising amplifier 36 and motor 37 to an angle $\theta$, equal to the true heading of the aircraft. At the same time, this servo positions rotor 21 of the air speed resolver 22 to the same angle $\theta$.

The TAS transducer 12 controls a servo mechanism comprising amplifier 17 and motor 18 to position the wiper of potentiometer 19 in proportion to the true air speed of the aircraft. In this way, a voltage $E_1$ is obtained that is proportional to the true air speed. The voltage $E_1$ is impressed across the rotor-winding 21 of the airspeed resolver synchro 22. The voltages which now appear across the stator windings 23 and 24 of the airspeed resolver, $E_1 \cos \theta$ and $E_1 \sin \theta$, respectively, represent the quadrature conponents of the airspeed voltage vector.

The rotor 39 of the wind resolver 36 is manually positioned to an angle $\phi$, equal to the true wind direction. The wiper of the wind potentiometer 43 is manually positioned to obtain a voltage $E_2$ which is proportional to the wind speed. This voltage $E_2$ is impressed across rotor 39 of the wind resolver 36. The voltages $E_2 \cos \phi$ and $E_2 \sin \phi$, which represent the quadrature components of the wind vector, are respectively induced in stator windings 37 and 38.

It may be seen that:

$$E_y = E_1 \sin \theta + E_2 \sin \phi$$
$$E_x = E_1 \cos \theta + E_2 \cos \phi$$

where $E_x$ and $E_y$ represent the quadrature components of the aircraft's ground track. The voltages $E_x$ and $E_y$ are obtained by the serial connections of windings 23, 37 and 24, 38, respectively and are impressed across the separate windings 46 and 47 of the ground speed and track resolver-converter 48 which functions as a vector converter, changing $x$—$y$ coordinates to polar coordinates. The manner in which this conversion is performed is based upon the construction of resolver 48 and its associated circuit arrangement in a servo loop comprising ground track amplifier 52 and motor 53. Resolver 48 has two rotor windings 49 and 51 which are spaced 90 degrees apart, rotor 49 providing a null or minimum signal input to the ground track amplifier 52 when the servo loop is in a dynamically balanced state. The angular position of rotor 49 is then equal to arctangent $$\frac{E_y}{E_x}$$

and becomes angle $\delta$ equal to the ground track of the aircraft. The angle $\delta$ comprises one input to the mechanical component resolver 50. Due to the fact that rotor winding 49 is maintained at a null signal position, the second rotor winding 51 is maintained at a maximum signal position and the voltage appearing across it equals $$\sqrt{E_y^2 + E_x^2}$$

This voltage $E_3$ is proportional to the ground speed of the aircraft.

The voltage $E_3$ is applied to an electro-mechanical integrator (EMI) 80 basically composed of rate generator 54, amplifier 56, and motor 55 whose operation can best be described in relation to the detailed schematic showing of FIG. 4. The voltage $E_3$ proportional to ground speed induced in winding 51 is applied across a variable calibration potentiometer 62, which modifies $E_3$ by a constant $k$ appropriate to the parameters of the circuit. A capacitor 60 is provided to resonate with the rotor winding 51 so that the lagging inductive current flowing in this particular circuit is a minimum. The portion $kE_3$ of the voltage $E_3$ proportional to the ground speed which is tapped off potentiometer 62 is applied through winding 59 of the rate generator 54 to the high impedance input of amplifier 56. Because of the high impedance associated with the input to amplifier 56, there is but negligible current flow through winding 59. It should be noted that windings 57 and 58 are reference phases of the split phase rate generator 54 and motor 55, respectively, and are energized by the same A.C. voltage phase. The output voltage of amplifier 56 is applied to the excitation phase winding 61 and motor 55 produces a torque resulting in shaft rotation proportional to the ground speed voltage $E_3$, or $$E_3 = K \frac{dn}{dt}$$

A sinusoidal E.M.F. is generated in winding 59 as the result of motion imparted from motor 55, the phase of the induced E.M.F. being in opposition to the phase of the originally applied voltage proportional to $E_3$ so that the input to amplifier 56 is modified accordingly with a corresponding effect on the voltage applied to winding 61 tending to reduce the torque of motor 55. The total angular displacement of the shaft becomes the time integral of the aircraft's ground speed or, $n = K \int E_3 dt$. Therefore, $n$ becomes the total number of shaft revolutions per unit time and represents the ground distance traveled. This shaft rotation comprises the second input to the mechanical component resolver 50.

In FIG. 3b, the mechanical resolver 50 is shown to operate on the ground distance vector $n \angle \delta$ to resolve it into its coordinate components, $n \sin \delta$ and $n \cos \delta$. The outputs of mechanical resolver 50 are two mechanical rotations, representing the N—S and E—W components of distance traveled. The outputs are utilized to position the wipers of center-tapped potentiometers 73 and 74, respectively. The voltage $2E_D$ is impressed across the ends of each of these potentiometers where $E_D$ is proportional to the total range of the equipment. In this manner, the voltages $E_D \sin \delta$ and $E_D \cos \delta$ are obtained that are proportional to the N—S and E—W ground distance traveled.

It is desirable at this point in the description of the operation of the bearing and distance indicating system to compare the two basic modes of operation. Basically, during either mode of operation the apparatus of the present invention is continuously computing the relative bearing of, and the distance to a preselected geographical point in polar coordinate form. However, prior to the selection of either base or target mode of operation, a reset operation is performed. With the selector 99 of the three position toggle switch assembly 95 in the reset position, the equipment is in a standby condition. The voltages $E_D \sin \delta$ and $E_D \cos \delta$ representing the N—S and E—W components of ground distance traveled, are zeroed and the relay contacts A and B of relay assembly K100 have been actuated by energization of relay coil 100 to disconnect in the ground distance resolver 88 from the circuit. The zeroing is accomplished by means of reset amplifiers 102 and 103 whose output circuits provide the excitation voltage for motors 104 and 105, respectively. The wipers of potentiometers 73 and 74 are thereupon caused to return to their neutral midpoints opposite the respective center-taps. The range counter 82 is also zeroed by virtue of resolver 88 being disconnected at this time. It is seen that the system is effectively in a neutral state. While in reset, the target data can be introduced into the target resolver 111 by the manual setting means 116 and 118. The rotor of the target resolver 111 is manually positioned to an angle $\alpha$ equal to the true bearing of the target from the base. The manual adjustment of the knob 118 permits positioning of the wiper of the target range potentiometer 119 in proportion to the range of the target from the base. This adjustment provides a voltage $E_4$ which is proportional to the distance from the base to the target. The voltage $E_4$ is impressed across the rotor winding 114 of target resolver 111. Voltages $E_4 \sin \alpha$ and $E_4 \cos \alpha$, the coordinates of the target vector $E_4 \angle \alpha$, now appear at the stator windings 112 and 113, respectively, of the target resolver. However, with selector 99 in the reset position these voltages have no effect for the moment in the system.

When the selector 99 is placed in the target position, relay contacts C—D and E—F of relay assembly K101 connect the target coordinate voltages $E_4 \sin \alpha$ and $E_4 \cos \alpha$ into the circuit, which is arranged as shown in FIG. 3b so that the distance traveled component voltages are algebraically added to the target coordinate voltages, or:

$$E_4 \sin \alpha + E_D \sin \delta = E_{TY}$$
$$E_4 \cos \alpha + E_D \cos \delta = E_{TX}$$

The final ground distance resolver-converter 88 in the circuit functions as a vector converter and has the voltages $E_{TX}$ and $E_{TY}$ impressed across the stator windings 86 and 87, respectively, as shown. Of the two rotor windings of resolver 88, winding 85 is connected through a servo loop comprising relative bearing amplifier 91 and motor 89 so as to constantly maintain the induced voltage in coil 85 at a null or minimum signal level. This arrangement is hence effective to mechanically position the rotor winding 85 of resolver 88, termed the sine winding, to an angle arctangent $$\frac{E_{TY}}{E_{TX}} = \beta$$

the true bearing of the target from the aircraft's geographic position. The relative bearing of the target $\mu$, is obtained by means of a differential synchro circuit that detects the difference between the ground track angle $\delta$ and $\beta$, the latter being the true bearing of the target. As will be observed in FIG. 3b, the rotor windings 96 of the relative bearing transmitter 98 have impressed thereon voltages which are proportional to the ground track angle $\delta$. If it were not for the fact that rotor winding 96 is angularly displaced by rotation imparted by motor 89, the voltage induced by transformer action in winding 97 would be identical with that of winding 96. However, since winding 96 is angularly displaced, a differential voltage results that is the algebraic difference between the voltages representing the ground track angle δ, and the true bearing to the target β. This differential voltage represents the relative bearing of target from the line of flight of the airplane, or μ. A conventional relative bearing repeater 106 with a rotor 108 mechanically coupled, as shown, to a movable pointer 110 provides a visual presentation of the relative bearing angle.

Since rotor winding 85 is maintained at a signal null position in the manner described above, its companion winding 83 being displaced 90 degrees, has induced therein a voltage $E_5 = \sqrt{E_{TY}^2 + E_{TX}^2}$, which is supplied to the range circuit, the operation of which can best be described in connection with the detailed schematic diagram of FIG. 5. The voltage-bucking null seeking type of servo loop operation, as shown, employs two step-down transformers 76 and 92 to provide working voltages in the generally desired range of magnitude required of the circuit. Rheostats 77 and 93 enable a precise adjustment of the required values of voltage to appear across potentiometers 78 and 94, respectively, in accordance with correct tracking of range counter 82. The voltage across potentiometer 78 is termed a range reference voltage. Capacitor 84 is provided to resonate with the rotor winding 83, and permits compensation of the lagging inductive current which would otherwise flow in potentiometer 94. The wiper on potentiometer 94 provides a range calibration means, since the position of its wiper is a measure of the magnitude of signal voltage appearing at the input of amplifier 79. The remaining components depicted are identical with those illustrated in FIG. 3b. It will be observed that the signal appearing at the input to amplifier 79 is comprised of three voltages in series. Each of the voltages algebraically combines with the others and they are respectively the voltage appearing between the wiper of potentiometer 94 and ground, the induced voltage $E_5$ in coil 83 proportional to target distance, and the voltage developed in that portion of potentiometer 78 between the neutral center-tap and its wiper. On application of this composite signal to amplifier 79, an output voltage is obtained which energizes the excitation phase winding of motor 81, initiating rotation of the motor shaft. The wiper of potentiometer 78 and range counter 82 are directly driven by the shaft of motor 81. It is in this particular part of the operation of the range circuit wherein the voltage-bucking null seeking function becomes apparent. The servo loop comprising amplifier 79 and motor 81 is in dynamic balance when the input signal is at a null or minimum level. Therefore, the wiper of potentiometer 78 must seek a point which will satisfy this condition. The voltage to either side of the neutral center-tap of potentiometer 78, it will be noted, provides for either an in-phase or directly 180 degree out-of-phase relationship. When this null point is found, counter 82 will indicate the range of the target from the aircraft. As the plane progresses in flight, the target distance voltage $E_5$ is continually being changed in accordance with the direction and speed of flight. As the plane flies toward the target, the distance voltage $E_5$ is decreased until the target is reached, at which time $E_5 = 0$.

With the selector 99 placed in the base position, the base mode of operation provides the pilot with distance and relative bearing indication relative to the base from which the flight originated. Whenever the selector 99 is in the base position, the target resolver windings 112 and 113 are removed from the circuit, leaving only the N—S and E—W component voltages of the distance traveled. Therefore, $E_{TY} = E_D \sin \delta$ and $E_{TX} = E_D \cos \delta$. Since $E_D \sin \delta$ and $E_D \cos \delta$ represent components of the distance traveled, $E_5$ will now represent the distance the aircraft is from its starting point or base, and angle β under these conditions will be the true bearing of the base from the aircraft's geographical position. The relative bearing to the base is obtained in the same manner as relative bearing to the target was obtained. As the aircraft flies toward base, the voltage $E_5$ is decreased, becoming zero when the aircraft reaches base. The visual indication of the instantaneous distance to the base is presented to the pilot on the range counter 82 of the system's indicator.

As an alternative mode of operation, briefly mentioned above, in connection with the preferred embodiment of the indicator illustrated in FIG. 2, the inventive system may be used with the aid of suitable switching to indicate magnetic and radio compass bearings. This particular type of operation places the system in the same operational condition as the base mode of operation with one exception. In a presentation of either radio compass or magnetic bearing, the relative bearing repeater 106 is disconnected from the ground track and target bearing circuits by means of a relay. The contacts of this relay may preferably be located between windings 97 and 107, and the chosen bearing data may conveniently be inserted at this point for visual presentation in conjunction with the relative bearing indication means comprising dial 109 and movable pointer 110. In this manner, the provision of an alternate mode of operation in the system of the instant invention permits the correlation of position information that may be available from other navigational devices installed in the aircraft.

A summary of the operation of the dead reckoning navigational system of the instant invention reveals that a fundamental process involved is the cumulative summation of N—S and E—W components of distance which are thereupon converted into polar coordinate form for presentation to the pilot in terms of a bearing and distance to either the aircraft's destination, or to the base from which the flight originated. In essence, the true airspeed of the aircraft is modified in accordance with the true heading and the prevailing wind speed and direction, and an algebraic summation of these components results in the determination of a ground track angle and speed of the aircraft. The component of speed is operated upon by an electro-mechanical integrator in a novel circuit arrangement which functions as the time integral of ground speed to produce a shaft rotation that is proportional to ground distance. A mechanical ball type component resolver utilizes the ground distance vector having the associated ground track angle as previously determined, and converts this polar quantity into two angular shaft displacements representing N—S and E—W components of distance. The angular shaft displacements position the wipers of potentiometers, and the corresponding voltage components which are obtained are introduced into a ground distance resolver-converter. The N—S and E—W components of base to target distance may at this time be conveniently inserted into this resolver-converter, which is electrically connected to the input circuits of both range and relative bearing servo mechanisms. The respective outputs of these servo loop circuits, representing polar coordinate bearing and distance information, are presented on the aircraft's indicator.

The embodiment of a bearing and distance indicating system according to the teachings of the instant invention enables the pilot of an aircraft in flight to be cognizant of his geographical position at all times. The dead reckoning navigation is performed automatically without resort to any manual calculation or plotting board, and provides the pilot with continuous and instantaneous position information in polar coordinate form. The geographical polar coordinate position of an aircraft in flight may be visually ascertained from a panel mounted indicator which shows ground track, range, and relative bearing selectively to either a base or a destination. Further, the bearing and distance indicating apparatus of the instant invention due to its greatly diminished volume and weight over existing dead reckoning equipment provides for ease of installation, being accommodated in the cockpit of a modern jet fighter aircraft in a simple and compact manner, compatible with the installation of existing equipment in the aircraft. The bearing and distance indicating system of the instant invention in a final analysis permits the pilot of a jet fighter aircraft to devote his full attention to operation of the aircraft according to the tactical assignment of his mission with the confidence of achieving a greater degree of success.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. In a bearing and distance indicating system, an indicator comprising, in combination, a fixed inner dial having a movable pointer for indication of a bearing, a synchro repeater including a rotor winding having an excitation voltage applied thereto and a stator winding having applied thereto a voltage quantity indicative of said bearing, means mechanically coupling said rotor with said movable pointer, a peripheral driven dial having a fixed pointer for indication of a second bearing, a control transformer including a rotor winding and a stator winding having voltages applied thereto indicative of the magnitude of said second bearing, an amplifier connected in a servo loop circuit to receive the induced voltage of said latter rotor winding, a motor connected to receive the output excitation of said amplifier and having a rotatable shaft coupled to drive in common said latter rotor winding and said peripheral dial, said rotatable shaft assuming an angular position corresponding to said second bearing in the dynamic balance of said servo loop circuit, and a counter requiring a rotary input for indication of range.

2. A bearing and distance indicating system for selectively providing an indication of the relative bearing and distance from an aircraft in flight to either a base or a target comprising, in combination: means operable to generate a signal proportional to the true airspeed of said aircraft, means operable to generate a signal proportional to the heading of said aircraft, means coupled to said airspeed and said heading signal generating means operable to generate signals proportional to the quadrature components of the aircraft's ground velocity with respect to a predetermined point, means energized by said component signals operative to generate a signal proportional to the ground speed of the aircraft and a signal proportional to the associated ground track angle; an integrator comprising an amplifier coupled to be energized by said ground speed signal, a motor and a generator having a common rotatable shaft, said motor and said generator each including a reference phase winding and an excitation winding, means to apply a reference signal to said reference phase windings, and circuit means serially connecting said excitation windings and said amplifier whereby said rotatable shaft is angularly displaced in proportion to the time integral of said ground speed signal; means responsive to the angular displacement of said rotatable shaft and to said ground track angle signal operative to generate signals proportional to the quadrature components of the displacement of the aircraft with respect to said predetermined point; means for generating signals proportional to the quadrature components of the range and bearing of a target with respect to said predetermined point; memory and summing means selectively energized by the algebraic sum of said aircraft displacement and said target component signals or by said aircraft displacement signals; means coupled to said last mentioned means for selectively visually presenting the relative bearing between said aircraft and said target or between said aircraft and said predetermined point and the range between said aircraft and said target or the range from said aircraft to said predetermined point; and means for visually presenting the ground track angle of said aircraft.

3. A bearing and distance indicating system for selectively providing an indication of the relative bearing and distance from an aircraft in flight to either a base or a target comprising, in combination: means operable to generate a signal proportional to the true airspeed of said aircraft, means operable to generate a signal proportional to the heading of said aircraft, means coupled to said airspeed and said heading signal generating means operable to generate signals proportional to the quadrature components of the aircraft's ground velocity with respect to a predetermined point; first rectangular to polar coordinate conversion means energized by said ground velocity component signals operative to provide a signal proportional to the ground speed of the aircraft and a signal proportional to the associated ground track angle; integrating means energized by said ground speed signal operative to provide a signal proportional to the scaler magnitude of the displacement of the aircraft with respect to said predetermined point; means energized by said aircraft displacement signal and said ground track angle signal operative to provide signals proportional to the quadrature components of the displacement of said aircraft with respect to said predetermined point; means to generate signals proportional to the quadrature components of the range and bearing of a target with respect to said predetermined point; second rectangular to polar coordinate conversion means; means operative to selectively apply to said second coordinate conversion means said signals proportional to the quadrature components of the displacement of said aircraft with respect to said predetermined point or the algebraic sum of the signals proportional to the quadrature components of the displacement of said aircraft with respect to said predetermined point and said signals proportional to the quadrature components of the range and bearing of said target with respect to said predetermined point; bearing indicator means coupled to be energized by the angular output signal from said second coordinate conversion means and by said ground track angle signal operative to indicate the relative bearing from said aircraft to said target or to said predetermined point; distance indicating means coupled to be energized by the radius vector output signal from said second coordinate conversion means operative to indicate the range from said aircraft to said target or to said predetermined point; and means coupled to said first coordinate convertor operative to indicate said ground track angle.

4. The combination of claim 3 wherein said bearing indicator and said ground track angle indicator means comprise: an instrument having a fixed inner dial provided with a movable pointer; a synchro repeater including a rotor winding having an excitation voltage applied thereto and a stator winding coupled to be energized by a signal proportional to the difference between said ground track angle and the angular output signal from said second coordinate conversion means; means mechanically coupling said rotor to said movable pointer; a peripherally driven dial having a fixed pointer associated therewith; a control transformer including a rotor winding and a stator winding energized by said ground track angle signal; an amplifier connected in a servo loop circuit to be energized by the voltage induced in said control transformer rotor winding; a motor connected to be energized by the output signal from said amplifier and having a rotatable shaft coupled to drive in common said control transformer rotor winding and said peripherally driven dial whereby said rotatable shaft and said dial assume an angular position corresponding to said ground track angle when said servo loop circuit is in dynamic balance.

5. The combination of claim 4 wherein said distance indicating means comprises: a center tapped potentiometer; means coupling a reference signal to said potentiometer; means coupling the radius vector signal from said second coordinate conversion means to the wiper of said potentiometer; an amplifier having the input circuit thereof coupled to the center tap of said potentiometer; a motor coupled to be energized by the output signal from said amplifier and having a rotatable shaft mechanically coupled to said wiper; a counter mounted adjacent an aperture in the fixed inner dial of said bearing and ground track angle indicator means; and means mechanically coupling said counter to said rotatable shaft.

6. The combination comprising: means to generate signals proportional to the quadrature components of the displacement of an aircraft in flight with respect to a first selected point; means operable to generate a signal proportional to the true airspeed of said aircraft, means operable to generate a signal proportional to the heading of said aircraft, means coupled to said airspeed and said heading signal generating means operable to generate a signal proportional to the ground track angle of said aircraft; means coupled to receive said ground track angle signal operable to indicate said angle; means to generate signals proportional to the quadrature components of the displacement of a second selected point with respect to said first selected point; a rectangular to polar coordinate convertor operable to provide a theta shaft output and a rho signal output; means to selectively apply said aircraft displacement signals or the algebraic sum of said aircraft and said second selected point displacement signals to said coordinate convertor; counter means coupled to receive said shaft output; and bearing angle indicating means energized by said rho output signal.

7. The combination of claim 6 wherein said coordinate convertor comprises: a resolver-convertor provided with a pair of ninety degree phase displaced rotor windings and a pair of ninety degree phase displaced stator windings; circuit means to selectively and respectively energize said stator windings with said displacement signals; a motor; an amplifier having an input circuit coupled to one of said rotor windings and an output circuit coupled to energize said motor; and means mechanically coupling the shaft of said motor to said rotor.

8. The combination of claim 7 wherein said counter means comprises: a center tapped potentiometer; circuit means to apply a voltage to the end terminals of the resistive portion of said potentiometer; a source of reference potential; circuit means to couple the voltage induced in the other of said rotor windings and said reference potential to the wiper arm of said potentiometer; a counter motor; amplifier means having an input circuit coupled to said wiper and an output circuit coupled to energize said counter motor; and means to mechanically couple the shaft of said counter motor to said wiper arm.

9. The combination of claim 8 wherein said bearing angle indicating means comprises: a differential synchro having a rotor winding and a stator winding; circuit means coupling said ground track angle signal to said differential synchro rotor winding; means mechanically coupling said resolver-convertor rotor to said differential synchro rotor; a synchro repeater having a rotor winding and a stator winding; circuit means coupling said differential synchro stator winding to said synchro repeater stator winding; and circuit means coupling an energizing voltage to said synchro repeater rotor winding.

10. The combination of claim 9 wherein said ground track angle indicating means comprises: a synchro control transformer having a stator winding and a rotor winding; circuit means coupling said ground track angle signal to said synchro control transformer stator winding; a ground track angle motor; and amplifier having an input circuit coupled to said synchro control transformer rotor winding and an output circuit coupled to energize said ground track angle motor; and means mechanically coupling the shaft of said ground track angle motor to said synchro control transformer rotor.

11. The combination of claim 10 including an indicator comprising: a fixed inner dial provided with a movable pointer; a peripherally driven outer dial concentrically rotatable about said inner dial in a plane parallel to the plane of said inner dial; a fixed pointer overlying said inner and outer dials; a counter mounted adjacent a window in said inner dial; means mechanically coupling said movable pointer to the rotor of said synchro repeater; means mechanically coupling said outer dial to the shaft of said ground track angle motor; and means mechanically coupling said counter to the shaft of said counter motor.

12. The combination of claim 11 wherein said means to generate said aircraft displacement signals comprises: means to generate signals proportional to the quadrature components of the ground velocity of said aircraft with respect to said first selected point; a second resolver-convertor provided with a pair of ninety degree phase displaced rotor windings and a pair of ninety degree phase displaced stator windings; circuit means respectively coupling said ground velocity component signals to said second resolver-convertor stator windings; a ground track motor; an amplifier having an input circuit coupled to one of said second resolver-convertor rotor windings and an output circuit coupled to energize said ground track motor; means mechanically coupling the shaft of said ground track motor to the rotor of said second resolver-convertor; and electromechanical integrator coupled to be energized by the voltage induced in the other rotor winding of said second resolver-convertor and operable to provide a shaft output; a mechanical component resolver having the shaft output of said electromechanical integrator and the rotor of said second resolver-convertor mechanically coupled thereto; a pair of center tapped potentiometers having the wiper arms thereof mechanically coupled to said component resolver; and circuit means applying a potential to said potentiometers.

13. The combination of claim 12 wherein said means to generate said ground track angle signal comprises: a synchro transmitter having a rotor winding and a stator winding; means mechanically coupling the rotor of said synchro transmitter to the rotor of said second resolver-convertor; and circuit means applying an energizing voltage to the rotor winding of said synchro transmitter.

14. The combination of claim 13 wherein said electromechanical integrator comprises: an input terminal; a motor and a generator having a common rotatable shaft and each provided with a control winding and a reference phase winding; an amplifier having an input circuit serially connected with said generator control winding to said input terminal and an output circuit coupled to energize said motor control winding; and circuit means coupling said reference phase windings to a source of reference potential.

References Cited in the file of this patent

UNITED STATES PATENTS

| | | |
|---|---|---|
| 2,560,527 | Dehmel | July 10, 1951 |
| 2,600,159 | Ergen | June 10, 1952 |
| 2,744,683 | Gray | May 8, 1956 |
| 2,808,999 | Chenery | Oct. 7, 1957 |
| 2,811,788 | Gallo | Nov. 5, 1957 |
| 2,848,160 | Biderman | Aug. 19, 1958 |
| 2,913,180 | Rusk | Nov. 17, 1959 |
| 2,915,247 | Tolson | Dec. 1, 1959 |
| 2,952,405 | Guarino | Sept. 13, 1960 |

OTHER REFERENCES

"Resolver Handbook" by Reeves Instrument Corporation, copyright 1954 (pages 14–15). (Copy in Div. 23 Analog Computer Library.)

(Other references on following page)

OTHER REFERENCES

"Basic Synchros and Servomechanisms" by Von Valkenburgh, copyright 1955 (pages 1–13), published by John F. Rider Publisher, Inc. (Copy in Scientific Libary.)

"New Sperry System Eases Pilot's Job" by Philip Klass, Aviation Week, Jan. 10, 1955, pages 58–61.

"Proceedings National Elec. Conference," vol. LIT, 1947 (computer for Aeronautical Navigation by O. H. Shuck), pages 210–218 relied on.

"Proceedings of the I.R.E.," vol. 41, No. 6, June, 1953. (E. H. Fritze: Punched-Card Controlled Aircraft Computer), pages 734–742.